United States Patent

[11] 3,578,334

[72] Inventor Itsuki Ban
829, Higashi-Oizumimachi, Nerima-ku,
Tokyo-to, Japan

[21] Appl. No. 713,656
[22] Filed Mar. 18, 1968
[45] Patented May 11, 1971
[32] Priority Mar. 18, 1967, Mar. 23, 1967, Apr. 14, 1967
[33] Japan
[31] 42/16625, 42/17679 and 42/23425

[54] AUTOMATIC PLAYING APPARATUS UTILIZING PLURALITY OF ENDLESS TAPE CARTRIDGES
9 Claims, 16 Drawing Figs.

[52] U.S. Cl. ........ 274/4, 179/100.2, 242/55.19
[51] Int. Cl. ........ G11b 5/54, G11b 15/28, B65h 19/06
[50] Field of Search ........ 179/100.2; 242/55.19; 274/4

[56] References Cited
UNITED STATES PATENTS

| | | | |
|---|---|---|---|
| 3,127,178 | 3/1964 | Osborne ........ | 179/100.2 |
| 2,781,689 | 2/1957 | Heyer ........ | 242/55.19 |

*Primary Examiner*—J. Russell Goudeau
*Attorney*—Nathan M. Briskin

ABSTRACT: An automatic playing apparatus for use with a plurality of endless tape cartridges comprising a planar base radially carrying and rotatably moving the plurality of the cartridges, a mechanism arresting movement of the casing to position the indexed cartridge in the play position, a pivotally movable deck including a magnetic head, and a capstan engageable and disengageable with the tape, a pinch roller therethrough when the cartridge in the play position, and so provided that the deck is moved from the base by deck driving means which are actuated upon searching an end mark signal on the tape for which time movement of the casing is effected to bring the next indexed cartridge into the play position or to change over a sound track on the tape.

Patented May 11, 1971 3,578,334

4 Sheets-Sheet 1

INVENTOR
ITSUKI BAN
BY
ATTORNEY

INVENTOR
ITSUKI BAN
BY
ATTORNEY

Patented May 11, 1971

3,578,334

4 Sheets-Sheet 3

INVENTOR
ITSUKI BAN

BY

ATTORNEY

Patented May 11, 1971

3,578,334

4 Sheets-Sheet 4

INVENTOR
ITSUKI BAN
BY
ATTORNEY

AUTOMATIC PLAYING APPARATUS UTILIZING PLURALITY OF ENDLESS TAPE CARTRIDGES

BACKGROUND OF THE INVENTION

This invention relates to an automatic playing apparatus utilizing a plurality of endless tape cartridges, and more particularly to an apparatus such as jukebox for reproducing a magnetically recorded information.

An apparatus according to the present invention is adapted to establish sequential cartridge indexing, and to play the tapes automatically in accordance with a specific sequential program.

Generally, the conventional type of cartridge comprises the magnetic tape reeled in a roll, the guide over which the tape is reeled over along with the forward end of the cartridge, the capstan disposed in the apparatus, and the pinch roller feeding the pinch roller in association therewith.

Various automatic playing apparatus are provided which contain a plurality of such cartridges to index one out thereof.

Recently proposed playing apparatus are mostly adapted to horizontally carry the cartridges to cause them to be stacked to each other, so that the cartridge is forwarded from its original position by manually or driving means such as the electromagnetic plunger to allow the capstan in the apparatus, magnetic head, and pinch roller to effect abutment upon the tape for its reproduction.

The problems associated with these playing apparatus are expensive since not only dimensions are considerably large but also a multicplity of magnetic heads and cartridge driving means are required to correspond to a number of cartridges.

It is also the case with the playing apparatus which is adapted to vertically carry a plurality of cartridges to arrange them in parallel to each other. Especially is this the case with the playing apparatus of this class wherein a plurality of cartridges are carried with the movable casing of annular or rectilinear shape, the indexed cartridge is moved to a predetermined position by movement of the casing, this indexed cartridge being further moved and positioned to and in the play position by the cartridge driving means to allow the capstan in the apparatus, magnetic head, and pinch roller to effect abutment upon the tape for its reproduction.

While this play apparatus provides advantage in the use of a single magnetic head, cartridge driving means should be construed as complicated one to involve difficulty in its manufacture and to result in out of order.

A playing apparatus carrying a plurality of cartridges therewithin is desired to meet requirements as in the following:

The apparatus should be adapted, first to program establishment of the cartridge indexing to play the tape; second to successively index the cartridge in accordance with the program to automatically play the tape; third, to index a sound track on the tape simultaneously therewith; fourth, to readily identify the recorded contents by a suitable means; fifth, to be compactly manufactured as light in weight as possible at low cost while eliminating disadvantages as previously mentioned; sixth, to avoid the use of the part or parts which causes troubles to the apparatus to secure stable tape reproducing.

SUMMARY OF THE INVENTION

It is, therefore, a principal object of the present invention is to provide an automatic playing apparatus utilizing a plurality of endless tape cartridges wherein the plurality of the cartridges are radially carried within a casing as a planar base to allow the forward end of the cartridges to be within the range of rotation of the casing, depression of a pushrod establishes the cartridge indexing to play the tape, engagement of the depressed pushrod with a raised portion disposed at the apparatus hold the cartridge in play position.

A further object of the invention is to provide an automatic playing apparatus utilizing a plurality of endless tape cartridges wherein a deck includes a capstan engageable with a pinch roller in the cartridge in the play position, a sound pickup head engageable with the tape in the cartridge, the pinch roller and the tape being disengaged from the capstan and the sound head respectively by the deck when it is swung to control the tape feed and its reproduction.

Another object of the invention is to provide an automatic playing apparatus utilizing a plurality of endless tape cartridges wherein research on an end mark on the tape contained in the indexed cartridge allows the deck to be moved away from the cartridge whereby arrest of movement of the casing is released to effect movement thereof until the next indexed cartridge is moved to the play position at which time the deck continues its retraction, thereafter the deck is automatically returned to its normal position, and the next indexed cartridge is ready to play the tape.

Still another object of the invention is to provide an automatic playing apparatus utilizing a plurality of endless tape cartridges in which a casing as a planar base having a two-level configuration and pivotable around a pivot, is provided so that the cartridges are arranged in offset manner whereby the contents of recorded information is identified.

A still further object of the invention is to provide an automatic playing apparatus utilizing a plurality of endless tape cartridges which is capable of establishment of a sound track indexing on the tape to be played simultaneously with the cartridge indexing by depression of a pushrod.

Another object of the invention is to provide an automatic playing apparatus utilizing a plurality of endless tape cartridges which, in conjunction with the use of a spring motor, requires no driving source such as electric motor to rotate the casing.

Further objects and additional advantages of the invention will become apparent from the following detailed description and annexed drawings, wherein:

DESCRIPTION OF SPECIFIC EMBODIMENT

Figures 1, 2, 3A, 3B:
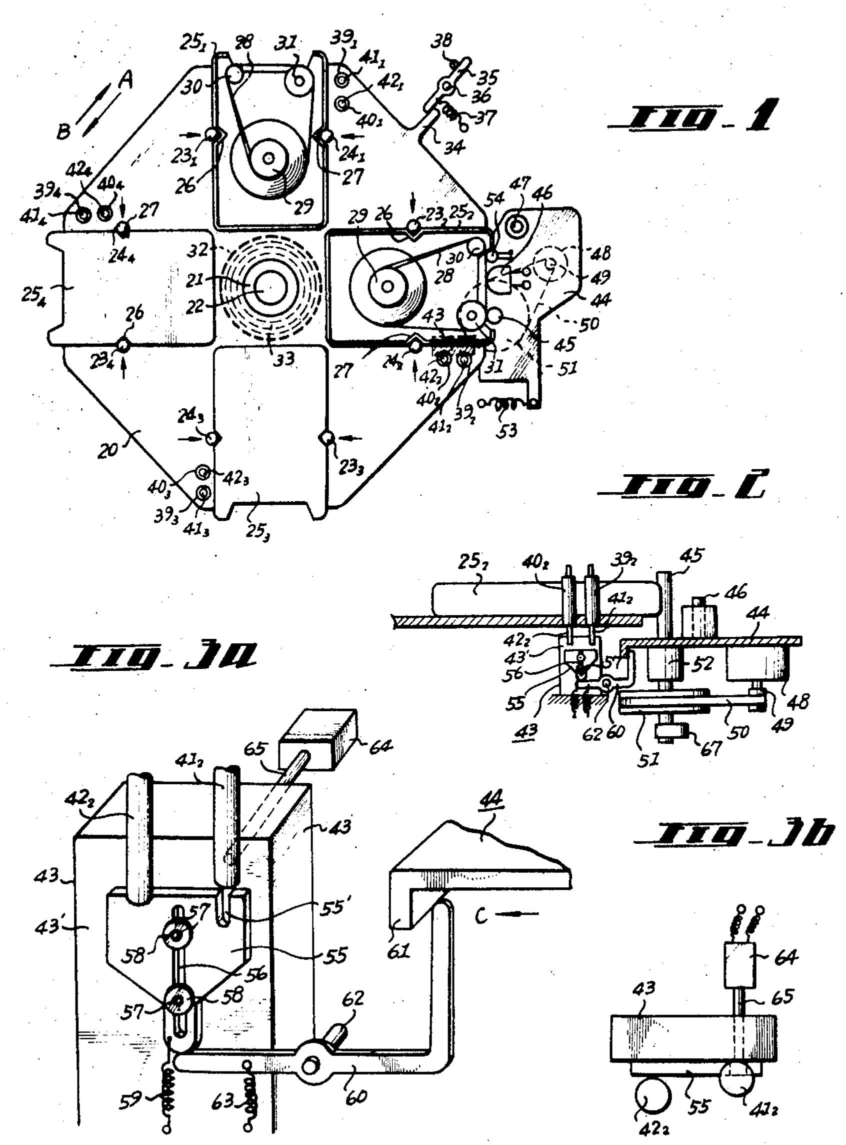
FIG. 1 is a plan view showing the form of an automatic playing apparatus according to the present invention.
FIG. 2 is a side elevation partly omitted away and in section of the automatic playing apparatus shown in FIG. 1.
FIG. 3*a* is a perspective view showing a mechanism for indexing a cartridge and a sound track.
FIG. 3*b* is a plan view of the mechanism shown in FIG. 3*a;*

Referring to the drawings, particularly, to FIG. 1, numeral 20 designates a casing of a planar shape which is rotatably supported by a central bearing 21 to the cabinet (not shown). Pairs of retainers $23_1$, $24_1$; $23_2$; $24_2$; $23_3$, $24_3$; $23_4$, $24_4$, such as steel balls are provided to urge them against pair of depressions 26, 27 disposed on the sidewalls of each cartridge 25 radially arranged at the casing 20 to hold it in position. Each of the cartridges $25_1$ to $25_4$ is provided with a rotary disc 29 in which a roll of an endless tape 28 reels, a tape guide 30, a rotatable pinch roller 31. A lid is provided to cover each cartridge, however, the detail of the lid is now shown in FIG. 1. The cartridges $25_1$ to $25_4$ are diametrically arranged at right angles to each other and the forward end of each cartridge slightly projects from the edge of the casing 20. The cartridge 25 may be away from the casing 20 and be displaced with another cartridge by drawing or pushing away against the bias of retainers received in the depressions.

Downwardly of the casing 20 is provided a cylindrical hollow member 32 which is secured to the cabinet (not shown) and between which and the bearing 21 a coil spring 33 is interposed at the ends thereof.

This will store energy in the spring 33 when the casing is manually rotated in the direction of arrow B to impart rotation to the casing 20 in the direction of arrow A.

A projection 34 is integrally formed of the edge of the casing 20 to arrest rotation of the casing 20 under influence of the spring 33 since it is engaged by a lever 35 which is pivoted by a shaft 36 at the center thereof. Arrest of rotation of the casing 20 constitutes the bias of a spring 37 extending from the lever 35 to the cabinet at the ends thereof. Rotation of the lever 35 according to the spring 37 is arrested by a stopper pin 38. Rotation of the lever 35 against the bias of the spring 37 releases the lever 35 from the projection 34 to initiate rotation of the casing 20.

Hollow shafts $39_1$ to $39_4$, $40_1$ to $40_4$ are mounted to the vicinity of the sidewalls of the cartridge. Pushrods $41_1$ to $41_4$, $42_1$ to $42_4$ are slidably and frictionally inserted within the hollow shafts respectively. The ends of pushrods are adapted to be normally projected from the ends of the hollow shafts. When pressure is applied to the rods, the lower ends thereof considerably project from the lower end of the shaft. These pushrods are provided to effect a sound track indexing when they are depressed and are rotatable as the casing is rotated. The lower end of the pushrod is engaged by a raised portion 43 mounted on the cabinet to arrest rotation of the casing 20 when the rod is depressed. FIG. 1 shows how rotation of the casing 20 may be arrested and the cartridge $25_2$ is held in the play position by depressing rods to be engaged with the raised portion or stop member 43.

Numeral 44 designates a deck which is provided with a capstan 45 and a magnetic head 46 and is swingably journaled by a pivot 47. The capstan 45 passes through the deck 44 and downwardly projects therefrom. The capstan 45 is further secured to a flywheel 51 to which rotation of a rotary shaft 49 of a motor 48 secured to the deck 44, is imparted through a belt 50 and is rotatably supported by a bearing 52 mounted to the deck 44. A spring 53 extends between the deck 44 and the cabinet to urge the deck against the cartridge to allow the capstan 45 to abut on the pinch roller 31 through the tape 29 while the magnetic head 46 is engaged by the tape 28.

Numeral 54 indicates an end mark search head which is mounted to the deck 44 to search for an end mark (not shown) of aluminum foil conductive material. The end mark search head is so constructed that the normally opened opposed contacts thereof are closed by the end mark. When the tape is played, the end mark search head 54 is adapted to be engaged by the tape 28 in the same manner as the magnetic head 46.

In FIG. 2, like part or parts are represented by like reference numerals as in FIG. 1.

To the surface 43' in the raised portion or stop member 43 by which the depressed pushrods are engaged is axially and slidably mounted a return lever 55 which includes a elongated slot 56 through which two guide pins 57 passes and a flange 58 at the end thereof. A clearance (not shown) is formed between the return lever 55 and the flange 58 to receive therebetween a spring (not shown) which is wound to one of the guide pins 57. The return lever 55 is urged by the bias of this spring against the surface 43' in the retainer 43. A spring 59 also extends between the portion of the lever 55 and the cabinet to normally urge the lever 55 downwardly. The location of the lever 55 is normally such that the upper edge of the lever is positioned below the depressed pushrods $41_2$, $42_2$ which are engaged by the raised portion 43.

It should be noted that the pushrod $41_2$ is engaged by the raised portion 43 ahead of the other rod $42_2$ when they are depressed. The pushrod $42_2$ is arranged to be spaced a distance more than at least the thickness of the lever 55 from the raised portion 43.

Numeral 60 designates a lever of which one end is positioned adjacent to the lever 55 and the other end is engaged by a rim portion 61 of the deck 44 and which is pivotally supported by a pin 62. The details of the lever 60 and the return lever 55 are illustrated in FIG. *3a*.

When the deck 44 is swingably moved by deck driving means, as will be described later, in the direction of arrow C, the lever 60 is rotated around a shaft 52 through the rim portion 61 in the rightward direction against the bias of the spring 63. Such rotation of the lever 60 causes the return lever 55 to effect its upward movement. Thus, the pushrod $41_2$ is caused to be upwardly moved to release its engagement from the raised portion or stop member 43. Next, the deck 44 is returned to its original position by the bias of the spring 53, the lever 60 and the return lever 55 are respectively restored to their original positions. As mentioned, engagement of the pushrod $41_2$ with the raised portion 43 is released by upward movement of the pushrod $41_2$, thereafter the push rod $42_2$ is caused to be engaged by the raised portion 43 so that rotation of the casing 20 is still arrested. Again, the deck 44 initiates its swingable movement, the pushrod $42_2$ is caused to be upwardly moved to release arrest of rotation of the casing 20. If all the pushrods $41_2$, $42_2$ are depressed, two swingable movements of the deck 44 are required to release arrest of rotation of the casing 20. Once, however, one of the two pushrods is depressed, arrest of rotation of the casing 20 is released by only one swingable movement of the deck 44. The push rod $41_2$ functions to serve both as arrest of rotation of the casing and establishment of a sound track indexing.

Figure 4:
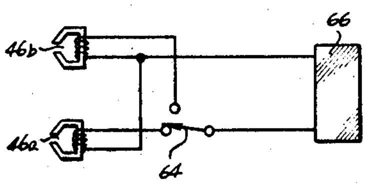
FIG. 4 is a circuit diagram for changing over a sound track.

Depression of the pushrod $41_2$ is applied to an operating lever 65 for a microswitch 64, the former which projects from the surface 43' actuates the microswitch 64 when the pushrod is engaged with the raised portion 43. The microswitch 64, see FIG. 4, is provided between magnetic heads **46*a*, 46*b* and an amplifier 66. The two magnets 46*a*, 46*b* are associated with relative sound tracks respectively and the amplifier is for amplifying the output of these magnetic heads. If the operating lever 65 is depressed, the output of the magnetic head 46*b* is applied to the amplifier 66. But if not, the output of the other magnetic head 46*a*** is applied thereto.

The magnetic head 46 shown in FIG. 1 is the complex heads serving as the heads **46*a*, 46*b*. A slit 55' formed in the return lever 55 enables the latter to avoid its engagement with the lever 65 when the lever 55** effects its vertical movement.

It may be possible that the depressed pushrods $41_1$ to $41_4$ causes the magnetic head to move vertically on the deck for establishment of the sound track indexing. A cam 67 shown in FIG. 2 is slidably mounted to the capstan 45 to form a part of deck driving means.

Figures 5, 6, 7:
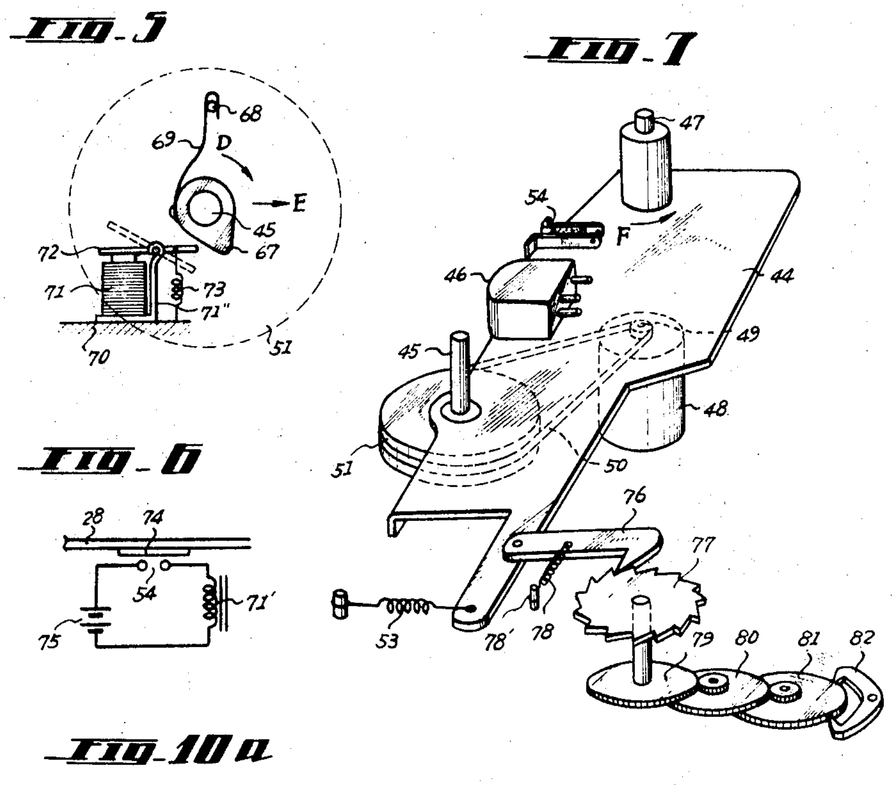
FIG. 5 is a plan view of deck driving means for use with the apparatus shown in FIG. 1.
FIG. 6 is a circuit diagram for energizing an electromagnet included in deck driving means shown in FIG. 5.
FIG. 7 is a perspective view of the deck for use with the playing apparatus shown in FIG. 1.

Referring to FIG. 5, the details of deck driving means are shown therein. A pin 68 projects from the flywheel 51 and a leaf spring 69 is engaged over the pin 68. The one end of the leaf spring 69 is secured to the cam 67. Therefore, the cam 67 is rotated as the flywheel 51 effects its rotation. To the cabinet 70 of the apparatus is provided an electromagnet 71 which includes a swingable actuator 72. The electromagnet 71, see FIG. 6, is connected to a supply source 75 through an end mark search head 54 which searches an end mark 74 on the tape 28 by means of an exciting coil 71'. With this arrangement, the contacts of the end mark search head 54 is short circuited by the end mark 74, the current is applied to the exciting coil 71' and the magnetic circuit is closed through a yoke 71'' so that the actuator 72 is attracted against the bias of the spring 73 from the dotted line to the solid line of FIG. 5. At this point, the end of the actuator 72 is positioned within the range of rotation of the cam 67 when it is rotated in the direction of arrow D. Engagement of the actuator with the cam establishes reaction on the cam 67 so that the flywheel is caused to be urged in the direction of arrow E through the bias of the spring 69. The deck 44, see FIG. 7 is rotated round a pivot 47 in the direction of arrow F under the bias of the flywheel 51. The leaf spring 69 retains the cam 67 to impart rotation of the flywheel 51 thereto and serves to avoid radical engagement of the cam 67 with the actuator 72. Since deck driving means is adapted to provide the cam 67 and the electromagnet 71, the deck 44 is capable of effecting substantial swingable movement in cooperation with the force of inertia of the flywheel at a minimum current applied to the exciting coil $71_1$.

FIG. 7 shows a mechanism for releasably engaging over the deck, wherein like parts are represented by like numerals.

When the deck 44 is rotated upon searching the end mark 74 in the direction of arrow F against the bias of the spring 53, the end of a pawl 76 which is pivotally mounted to the deck 44 is meshed with one of the teeth of a ratchet wheel 77 to arrest rotation of the deck 44. A spring 78 extending between the pawl and a pin 78' on the cabinet provides for maintaining engagement of the pawl 76 with the ratchet wheel 77. The ratchet wheel 76 is coupled through multifying gears 79, 80 and 81 to a governor claw 82. Thus, the number of rotations relative to the ratchet wheel 76 is governed by the gear 81 and the claw 82. With this arrangement, the deck 44 is gradually returned at a certain interval to its original position where the capstan 45 may be engaged with the pinch roller of the cartridge in the ready-to-play position.

Operation of the playing apparatus illustrated in FIGS. 1 to 7 will be described hereinafter.

As viewed in FIG. 1, with engagement of the depressed pushrod $41_2$ with the raised portion 43, assuming that the tape running effects reproduction of a sound track (not shown) running transversely of the lower end of the tape. The tape feed progresses and the end mark 74 on the tape 28 short circuits the contacts of the end mark search head 54 whereby the exciting coil 71' of the electromagnet 71 is actuated to allow the actuator 72 to be attracted to the yoke 71''. As a result, the cam 67 which is rotated with the flywheel 51 is engaged with the actuator 72 and reaction derived from such engagement rotates the deck 44 against the bias of the spring 53 while the capstan 45 moves away from the pinch roller 31 and the magnetic head 46 is away from the tape 28. This terminates running of the tape 28 at the same time reproduction of the sound track on the tape is completed. When the deck 44 is being away from the cartridge 25, the limb portion 61 acts on the lever 60 to allow it to be rotated against the bias of the spring 59 about the shaft 62 to thereby raise the return lever 55 against the bias of the spring 59. That is, the pushrod $41_2$ is slidable moved upwards after releasing from the raised portion 43. Rotation of the casing 20 is now again initiated by energy stored in the spring 33 and may be continued until the next depressed pushrod $42_2$ is engaged by the raised portion 43 to bring the cartridge 25 into the play position. The deck is retained by meshing the pawl 76 with the ratchet wheel 77 after the deck moves away from the cartridge $25_1$ and it is maintained in position for a certain interval by time lag means which comprises a governor mechanism. Thereafter, the deck 44 is returned to its normal position by the bias of the spring 53 so that the pinch roller 31 is caused to be engaged with the capstan to feed the tape 28. In this reproduction of the tape 28, audio information recorded on the sound track on the upper portion of the tape is aplayed since the pushrod $41_2$ is raised and the operating lever 65 is deactuated. At completion of reproduction of such sound track the end mark search head 54 senses the end mark 74 whereby the deck 44 moves away from the cartridge $25_2$ as previously described. Thus, the pushrod $42_2$ is upwardly moved by the return lever 55 to release from the raised portion 43 to thereby allow the casing 20 to be rotated in the direction of arrow A. Assuming that the upper sound track is desired to be played, rotation of the casing 20 is arrested at the point where the pushrod $42_4$ is engaged with the raised portion 43. As a result, the cartridge $25_4$ is positioned in the play position and the tape reeled on the cartridge $25_4$ is run for its reproduction when the deck 44 is returned to its original position after a certain period of the time as mentioned.

The apparatus according to the invention has advantages in that the cartridge indexing is established by depressing a desired pushrod and the sound track indexing is effected for its reproduction.

It should be noted that the lag time when the deck 44 is returned to its normal position is such determined that it may be longer than that for which the casing 20 makes its one rotation.

Figure 8:
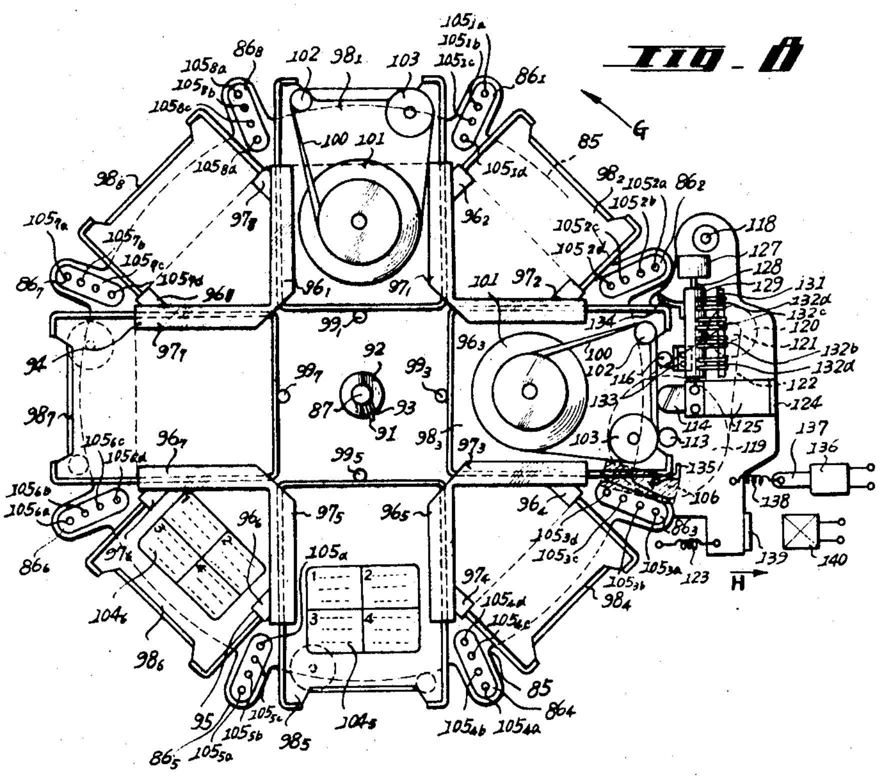
FIG. 8 is a plan view showing a modified form of an automatic playing apparatus according to the present invention.
Figure 9:
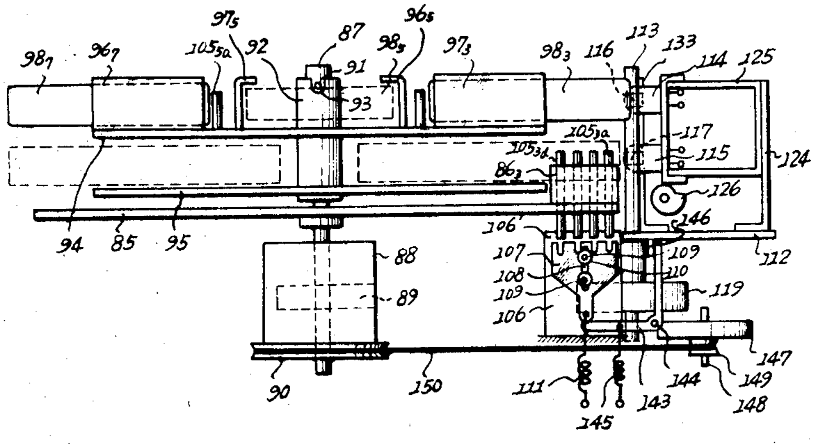
FIG. 9 is a side elevation partly omitted away and in section of the apparatus shown in FIG. 8.

A modified form of the playing apparatus is shown in FIGS. 8 and 9.

Numeral 85 designates a rotary plate which radially supports at each edge support members $86_1$, $86_2$ ..... $86_8$ spaced regularly and each having four openings. The rotary plate 85 has a rotary shaft 87 mounted to the center portion thereof. The rotary shaft 87 is supported in the apparatus through a bearing member (not shown). A rotatable hollow column 88 is provided to pass the lower portion of the rotary plate 85 therethrough. A spring 89 spirally extends between the inner surface of the column 88 and the rotary shaft 87. The rotary shaft may be rotated as a pulley 90 provided at the lower end of the column 88 is rotated in a manner as will be described later. A tubular member 92 is slidably mounted to the upper portion of the shaft 87 and is loosely fitted thereto under influence of a needle 91 mounted to the shaft 87 and the slit 93. An upper planar housing 94 and a lower planar housing 95 are each horizontally mounted to the shaft 87 to receive the cartridges on each surface thereof. As seen in the drawing, these two housings are identical to each other and are provided with a plurality of pairs of slide guides $96_1$, $97_1$; $96_3$, $97_3$; $96_5$, $97_5$; $96_7$, $97_7$; and $96_2$, $97_2$; $96_4$, $97_4$; $96_6$, $97_6$; $96_8$, $97_8$ to slidably guide the cartridges $98_1$, ..... $98_8$, inclusive. Retaining pins are mounted to each housing to prevent the cartridges from being further moved from a predetermined position where the forward end of each cartridge slightly projects from the periphery of the housings 94, 95.

It should be noted that the one housing intersects the other housing at 45°, both housings being fixed to the tubular member 92. Accordingly, as clearly seen in FIG. 1, the cartridges $98_1$, ..... $98_8$ are radially arranged with their front end portions not overlapping each other. The cartridges $98_1$, ..... $98_8$ are of the same type and each of them contains an endless tape 100, a rotatable disc 101 which is provided with the spirally wound tape 100, a tape guide 102, and a rotatably pivoted pinch roller 103. In the drawings the cartridges $98_1$ and $98_3$ are shown with their lids removed to show the internal arrangement. Labels $104_5$ and $104_6$ are attached to the lids of the cartridges $98_5$ and $98_6$ respectively to indicate the transcriptional contents of the tape 100, the numerals 1, 2, 3 and 4 corresponding to four recording tracks respectively. Each cartridge is provided with such label so that, as seen in FIG. 8, the user easily identifies the transcriptional contents of the eight cartridges thereby. This is very convenient for indexing tapes and tracks and in this respect this arrangement is better than any other one. This is also the case with each of the playing apparatus of FIGS. 1—7.

The support members $86_1$ ..... $86_8$ mounted to the periphery of the rotary plate 85 have, in their respective holes, pushrods $105_{1a}$, $105_{1b}$, $105_{1c}$, $105_{1d}$; $105_{2a}$, $105_{2b}$, $105_{2c}$, $105_{2d}$; $105_{3a}$, $105_{3b}$, $105_{3c}$, $105_{3d}$; $105_{4a}$, $105_{4b}$, $105_{4c}$, $105_{4d}$; $105_{5a}$, $105_{5b}$, $105_{5c}$, $105_{5d}$; $105_{6a}$, $105_{6b}$, $105_{6c}$, $105_{6d}$; $105_{7a}$, $105_{7b}$, $105_{7c}$, $105_{7d}$; $105_{8a}$, $105_{8b}$, $105_{8c}$, $105_{8d}$, each pushrod being slidably inserted into the opening and friction-engaging same. Depression of the pushrod causes it to move downward until its lower end projects from the lower side of the rotary plate 85 and it is stopped by friction. The drawing shown the pushrods $105_{3a}$, $105_{3b}$, $105_{3c}$, $105_{3d}$ in their respective depressed portions, the lower ends thereof engaging a raised portion or stop member 106 mounted to the apparatus so as to prevent the rotary plate 85 from rotating. The four pushrods mounted to each of the support members $86_1$ ..... $86_8$ are arranged obliquely of the stop member 106, as shown in FIG. 10*b*. Accordingly, in the case of FIG. 8, first the pushrod $105_{3d}$ abuts against the stop member 106, a return lever 107 pushes up the pushrod $105_{3d}$ and returns same, then the push rod $105_{3c}$ abut against the stop member 106; such abutment being likewise carried out by and in the order of pushrods $105_{3b}$ and $105_{3a}$.

The return lever 107 is provided with a guide slot 108 and is through this slot 108 mounted to the surface 106' of the stop member 106 by two guide pins 109, 109 having a flange 110 so as to be vertically movable. A slight clearance (not shown) is provided between the return lever 107 and the flange 110 to hold therein springs wound about the guide pins 109, 109 so as to urge the return lever 107 against the surface 106'. A spring 111 is provided between a portion of the return lever 107 and a stationary portion of the body so as to normally urge the return lever 107 downwardly. Accordingly, the upper edge of the return lever 107 is normally positioned below the lower end of the pushrod which engages the stop member 106.

A deck 112 is provided with a capstan 113 to be urged against a pinch roller of the cartridge in reproducing position, magnetic heads 114 and 115 to be in contact with the tape of the cartridge held in the housings 94 and 95, and end mark search heads 116 and 117 to be in contact with the tape. The deck 112 is swingably supported by a pivot 118. The capstan 45 is rotatably pivoted to the deck 112, and to the downwardly projecting portion of the deck 112 there is secured a flywheel 119. The capstan 145 is of elongated shape and may be urged against either of the pinch rollers of both cartridges of the housings 94 and 95. A motor 120 is mounted to the lower side of the deck 112 and a belt 122 is passed between the rotary shaft 121 of the motor 120 and the flywheel 119 so that the rotational power of the motor 120 may be imparted to the capstan 113. A spring 123 is arranged between the deck 112 and the stationary portion of the apparatus so that the deck 112 is normally so urged that it tends to swing toward the cartridge held in the housings 94 and 95, so that the capstan 113 is urged against the pinch roller of the cartridge in reproducing position and the magnetic head 114 or 115 and the end mark search head 116 or 117 are brought in contact with the tape.

The magnetic heads 114 and 115 are vertically arranged at the front edge of a leaf spring frame member 125 fixed at end thereof to a support plate 124 fixed to the deck 112. The leaf spring frame member 125 is downwardly urged by its own resiliency and abuts against an eccentric cam 126 which is secured to the end of a rotary shaft 128 of a rotary solenoid 127 fixed to the upper side of the deck 112. The eccentric cam 126 rotates together with a conductive cylinder 129 fixed to the rotary shaft 128. Accordingly, as will be described later, the magnetic heads 114 and 115 move vertically and carry out recording track changeover operation every time the eccentric cam 126 swings 90° through the rotary solenoid 127.

Figure 11:
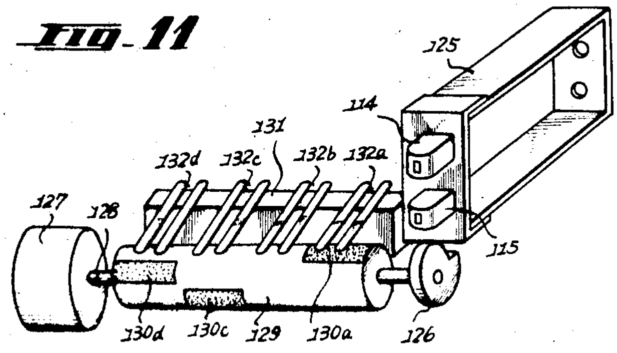
FIG. 11 is a perspective view showing an arrangement for supporting magnetic heads which effects vertical movement and for use with the apparatus shown in FIG. 8.

The surface of said conductive cylinder 129 is provided, as shown in FIG. 11, with four insulating portions $130_a$, $130_b$, $130_c$ and $130_d$ spaced one another by 90°. An insulating base 131 is secured to the upper side of the deck 112 and is provided with four pairs of conductive brush contacts $132_a$, $132_b$, $132_c$ and $132_d$ to be in contact with said conductive cylinder 129. The conductive cylinder 129, the insulating portions $130_a$, $130_b$, $130_c$ and $130_d$ and the brush contacts $132_a$, $132_b$, $132_c$ and $132_d$ cooperative to control the operation of the rotary solenoid 127 and control the vertical movement of the magnetic heads 114 and 115. This control operation will be described later in detail.

A support plate 133 is secured to the deck 112 and is provided with the end mark search heads 116 and 117 on and beneath it. Guides 134 and 135 are provided on the deck 112 to hold the front edge of a cartridge in play position therebetween so that the positioning of the cartridge relative to the capstan 113, the magnetic heads 114 and 115, and the end mark search heads 116 and 117 are kept constant. An electromagnetic plunger 136 is so arranged that an operative rod 137 is connected to the deck 112 through a spring 138 so that a current supply circuit may be established through the end mark search head 116 or 117. When the end mark (not shown) consisting of a conductive foil provided upon the tape short circuits across the contacts of the end mark search heads 116 and 117, a current is supplied to the coil so that the operative rod 137 is attracted and, through the spring 131, the deck 112 is swung in the direction of arrow H in FIG. 8. When the swingable deck 112 brings the end mark search head 116 or 117 out of contact with said end mark, current supply to the electromagnetic plunger 136 is stopped so that the deck 112 is not driven. A member 139 of magnetic substance such as mild steel is attracted to an electromagnet 140 fixed to the apparatus so that the deck 112 is locked to a position, which is apart from the cartridge, against this resiliency of the spring 123.

Figure 12:
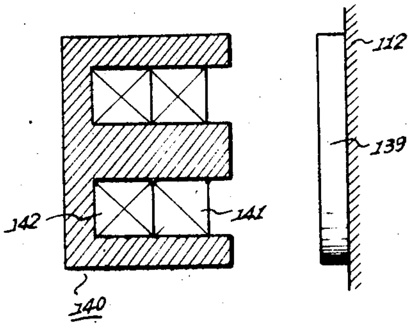
FIG. 12 is a side elevation of deck retaining means in section for use with the apparatus shown in FIG. 8.

As shown in detail in FIG. 12, the electromagnet 140 is provided with two coils 141 and 142. The coil 141 is normally supplied with current and the resulting magnetic flux causes attraction of magnetic substance member 139. The coil 142 is normally not supplied with current but upon returning of the deck 112 a pulse current is supplied thereto, as described later, producing a magnetic flux which cancels the magnetic flux due to the coil 142. Thus, when the coil 142 is supplied with current the electromagnet 140 does not attract the member 139 so that the deck 112 is automatically returned through the bias of the spring 123.

A lever 143 is pivoted to the apparatus through a pin 144. One end of this lever 143 engages the lower end of said return lever 107 and the other end thereof engages, through the bias of a spring 145, a projection 146 of the lower side of the deck 112. When the deck 112 is swung in the direction H of FIG. 8 through the operation of the electromagnetic plunger 136, the lever 143 is swung through the projection 146 against the bias of the spring 145 and raises the return lever 107 against the bias of the spring 111. A little before the swingable deck 112 is locked through the member 139 and the electromagnet 140, the return lever 107 causes the pushrod to be lifted out of engagement with the stop member 106. Immediately after this disengagement of the pushrod, the end of the lever 143 is disengaged from the lower end of the return lever 107 so that the return lever 107 returns through the bias of the spring 111. At the time when the return lever 107 returns, the deck 112 is locked through the member 139 and the electromagnet 140. Then, when the deck 112 returns through the bias of the spring 123, the lever 143 also returns through the bias of the spring 145 so that the end thereof is again positioned below the lower end of the return lever 107. In order to smoothly carry out this operation, in connection with the return lever 107, there is provided a slight clearance between the guide aperture 108 and the guide pin 109 so that a slight horizontal movement is possible in addition to vertical one.

A pinch roller 147 is pivoted to the apparatus by a pivot 148 and is brought into contact with the capstan 113 when the deck 112 is locked through the member 139 and the electromagnet 140 so as to be rotated through the rotation of the capstan 113. To the shaft 148 of the pinch roller 147 there is secured a pulley 149, and a belt 150 is passed between this pulley 149 and the pulley 90 of the hollow column 88. Accordingly, the column 88 is rotated through the rotation of the capstan 113. In FIG. 9 the position occupied by a cartridge is shown in dotted lines on the housing 95.

Figure 10A:
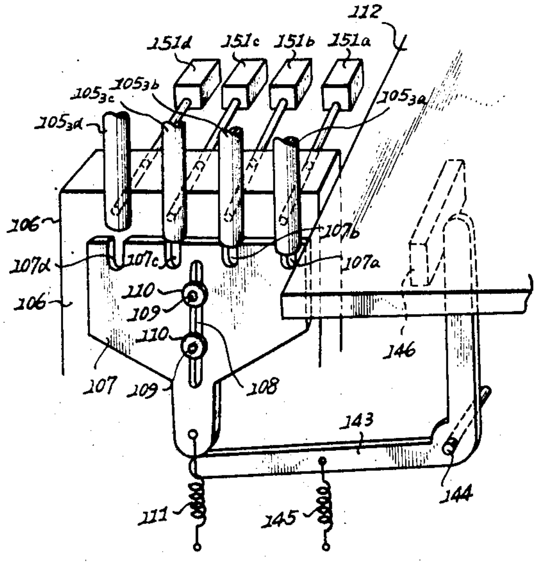
FIG. 10*a* is a perspective view showing a mechanism for indexing a cartridge and a sound track with respect to the apparatus shown in FIG. 8.
Figure 10B:
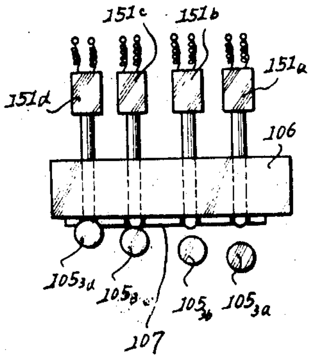
FIG. 10*b* is a plan view of the mechanism shown in FIG. 10*a;*

In FIG. 10 the same numeral as used before indicates a corresponding part. The pushrods $105_{3a}$, $105_{3b}$, $105_{3c}$, and $105_{3d}$ are in respective depressed positions, and the pushrod $105_{3d}$ engages the stop member 106 in advance of other pushrods. The operative rods of microswitches $151_a$, $151_b$, $151_c$, and $151_d$ mounted on the apparatus slidably pass through the stop member 106, and their ends project from the surface 16' of the stop member 106. The operative rod of the microswitch $151_d$ is depressed by the pushrod $105_{3d}$ engaging the stop member 106, bringing the contact into closed state. In the upper portion of the return lever 107 there are provided slits $107_a$, $107_b$, $107_c$ and $107_d$ for abutment against the operative rods of the microswitches when the return lever 107 makes vertical movement.

FIG. 11 shows arrangement for supporting the magnetic heads 114 and 115 and vertical movement described in connection with FIGS. 8 and 9, and the same numeral indicates corresponding part.

FIG. 12 shows the relation between the magnetic substance member 139 and the electromagnet 140.

Figure 13:
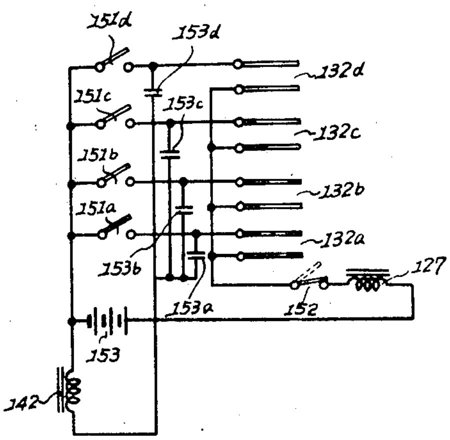
FIG. 13 is a circuit diagram which is completed by a rotary solenoid of the magnetic head vertically moving mechanism and the electromagnet of deck retaining means.

FIG. 13 shows a current supply circuit for said rotary solenoid 127 and the coil 142 of the electromagnet 140, and the same numeral indicates corresponding part. When, as shown in FIG. 10, the microswitch $151_d$ is operated through pushrod $105_{3d}$ so that the contact is brought into closed state, the rotary solenoid 127 is connected to a current source 153 through a switch 152, the brush contact $132_d$ and the microswitch $151_d$. The switch 152 is operated by the rotary solenoid 127 in such a manner that the switch 153 is opened when a rotor (not shown) in the rotary solenoid 127 reaches the end of its rotation. Accordingly, the conductive cylinder 129 is rotated by 90° in response to opening or closure of the switch 152. When the brush contact $132_d$ is brought in contact with the insulating portion $130_d$, the brush contact $132_d$ becomes not conducting and current supply to the rotary solenoid 127 is stopped so that the conductive cylinder 129 is stopped. This causes also stoppage of the eccentric cam 126 and, through depression of the pushrod $105_{3d}$, the magnetic heads 114 and 115 is positioned corresponding to the specified recording track. When the microswitches $151_a$, $151_b$, $151_c$, and $151_d$ are closed, the charge on capacitors $153_a$, $153_b$, $153_c$, and $153_d$ are discharged and thereby current is supplied to the coil 142. Accordingly, current is supplied to the electromagnetic plunger 136, and, after withdrawal of the deck 112, the pushrod $105_d$ closes the microswitch $151_d$ and thereby current is supplied to the coil 142. As a result, the attraction exerted by the electromagnet 140 to the magnetic substance member 139 becomes instantly zero, and the deck 112 is automatically returned through the bias of the spring 123. Thus, with the circuit as shown in FIG. 13, index of recording track and returning of the deck 112 are automatically carried out.

Now, according to the designation of the pushrod $105_{3d}$, the cartridge $98_3$ is brought to the play position. When reproduction is completed with respect to the specific recording track and the end mark (not shown) of the tape 100 of the cartridge $98_3$ is brought in contact with the end mark search head 116, current is supplied to the electromagnetic plunger 136 and the deck 112 is withdrawn from the cartridge $98_3$. This withdrawal of the deck 112 causes the return lever 107 and the pushrod $105_{3d}$ to be lifted out of engagement with the stop member 106. As a result, the rotary plate 85 tends to rotate due to rotating force in the direction of arrow G of FIG. 8 through the capstan 113, the pinch roller 147, the pulley 149, the belt 150, the pulley 90, the hollow column 88, the spring 89 and the rotary shaft 87. The rotation of the rotary plate 85, however, is terminated when the rotation is only slightly made because of engagement of the pushrod $105_{3c}$ and the stop member 106. Upon this engagement the microswitch $151_c$ is closed so that the charge on the capacitor $153_c$ is discharged with the coil 142. Then the deck 112 is disengaged and is returned, and at the same time, due to the operation of the rotary solenoid 127 the magnetic head 114 moves vertically to index recording track. The slight rotation of the rotary plate 85 causes rotation of the housing 94. Between these two there is provided an angular freedom under control of the pin 91 and the slit 93 so that when the deck 112 is returned, the front edge of the cartridge $98_3$ is securely held between the guides 134 and 135. Accordingly, the position of the cartridge $98_3$ relative to the capstan 113 and the magnetic head 114 is kept constant. The angular freedom between the rotary plate 85 and the housings 94 and 95 may be established by means other than the structure of the pin 91 and the slit 93. It is desirable to so arrange that the front edge of the cartridge may readily enter into between the guides 134 and 135, for example to so arrange by magnetic force that the housings 94 and 95 is brought to a constant position at its angular freedom range with respect to the rotary plate 85.

Repeating the above operations, reproduction is made with respect to the four recording tracks of the cartridge $93_3$. When, at least, reproduction is completed with respect to the recording track indexed by the pushrod $105_{3a}$, the pushrod $105_{3a}$ is caused to be lifted by the return lever 107 so that the rotary plate 85 is disengaged and rotates up to the position where the next depressed pushrod engages the stop member 106. While the rotary plate 85 rotates the microswitches $151_a$ ..... $151_d$ remain open so that the deck 112 remains locked due to the action of the magnetic substance member 139 and the electromagnet 140 and the rotation of the housings 94 and 95 is not prevented.

Figure 14:
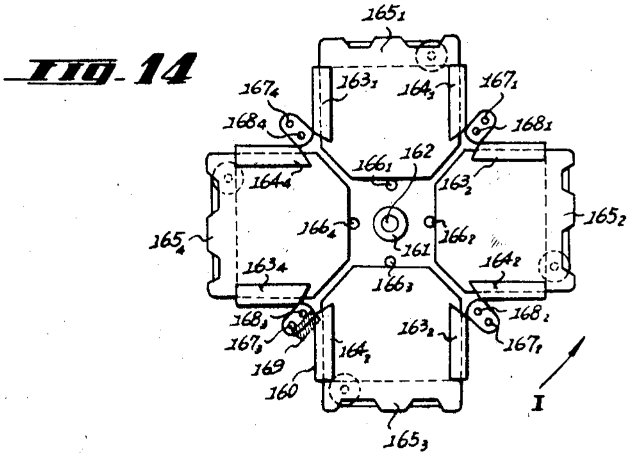
FIG. 14 is a plan view showing partly a further modified form of an apparatus according to the present invention.

FIG. 14 shows another example of the player arrangement of the present invention, indicating the relation between housings where diameter may be made smaller and cartridges. A housing 160 is rotatably supported through a bearing 161 by a pivot 162 secured to the apparatus and is under the influence of rotational power in the direction of arrow I by means of spring, motor, etc. (not shown) as the aforementioned examples. Guides $163_1$, $164_1$; $163_2$, $164_2$; $163_3$, $164_3$ and $163_4$, $164_4$ are provided for mounting cartridges $165_1$ ..... $165_4$ to the housing 160. Each of the cartridges $165_1$ ..... $165_4$ is of the shape of hexagon with its rear side of cutaway appearance. Due to this shape the housing 160 is able to have a diameter which is smaller than that of the aforementioned examples, thus providing more small-sized playing apparatus. Stop pins $166_1$ ..... $166_4$ are secured to the housing 160 to control the extent of insertion of the cartridges $165_1$ ..... $165_4$. Pushrods $167_1$, $168_1$; $167_2$, $168_2$; $167_3$, $168_3$, and $167_4$, $168_4$ are mounted to the housing 160 in such a manner that they are slidable and may be friction-engaged, in order to specify the cartridge and recording track. A stop member 169 is mounted to the body to be engaged by a depressed pushrod so as to prevent the housing 160 from rotating. The relation between the cartridges and the housing as shown in FIG. 14 may be advantageously applied to any of the aforementioned examples so as to make it more small-sized.

In addition to a cartridge of the type incorporating a pinch roller as shown in the drawings, there is one of the other type which is without such incorporated pinch roller. With the latter type of cartridge the base portion thereof is provided with an aperture through which, upon insertion of the cartridge into the playing apparatus, a pinch roller may enter the cartridge, the pinch roller being collapsibly mounted to the apparatus. Accordingly, when such type of cartridges are to be utilized, a pinch roller may be collapsibly mounted to the housing.

In the illustrated examples, the deck is caused to withdraw from the cartridge by detecting an end mark consisting of a conductive foil upon the tape, the end mark may also be the nontranscribed portions of starting and end portions of the recording tape, or portions where specific signal is recorded. In this case the end mark detecting head is not of contact type but of magnetic head type.

While only the preferred forms of the invention has been described, it should be understood that various changes or modifications may be made within the scope of the appended claims without departing from the spirit of the invention.

I claim:

1. An automatic playing apparatus for use with a plurality of endless tape cartridges, comprising a rotatable planar housing provided with means to hold a plurality of endless tape cartridges horizontally and radially arranged in a manner that each forward end thereof is outwardly oriented, housing driving means for rotating said housing in one direction, at least one normally raised pushbutton rod slidably disposed in said housing associated with each tape cartridge and adapted to index the tape stored within each associated cartridge when an associated raised rod is depressed, the rods being slidable independently of each other, a stop member mounted below said housing and positioned to engage a depressed pushbutton rod and thereby arrest the rotation of said housing when the cartridge associated with the depressed rod is rotated to the play position, a pivotally movable deck having a capstan adapted to be in abutment with a pinch roller of the cartridge in the play position and capstan driving means and including a magnetic head for engaging the endless tape of said cartridge, spring means normally urging said deck against the cartridge in the play position, means for sensing an end mark on said tape, deck driving means responsive to said sensing means for retracting said deck from the cartridge when said end mark is sensed, pushbutton rod return means coupled to and movable with said deck in response to actuation of said deck driving means to move a depressed pushbutton rod engaging said stop member out of engagement therewith and to return said depressed rod to its normal raised position, said housing driving means being operable independent of said pushbutton rod return means, and deck retaining means for maintaining the deck in the position where said deck is away from the cartridge at least until a depressed pushbutton rod is engaged by the stop member, whereby the housing rotates each indexed tape, sequentially, to the play position to permit one or more tapes to be played for a single actuation of said housing driving means.

2. An automatic playing apparatus as claimed in claim 1 comprising a plurality of said pushbutton rods slidably mounted in the housing associated with each cartridge for indexing the cartridge and the sound track of the tape, and sound track switching-over means operable by means of the pushbutton rod when the depressed pushbutton rod is engaged by the stop member.

3. An automatic playing apparatus as claimed in claim 1 wherein said housing driving means comprises a cylindrical hollow shaft securely embracing the downwardly extending rotatably supported rotary shaft of the housing, and a coil spring having one end thereof wound on said rotary shaft and the other end wound on said hollow shaft, whereby said housing is automatically rotated in one direction by said spring in which energy is stored after said housing is manually rotated in the opposite direction.

4. An automatic playing apparatus as claimed in claim 1 wherein two pairs of tape cartridges are diametrically and horizontally arranged in the plane of said housing, the forward end of each of said cartridges outwardly projecting from the periphery of said housing.

5. An automatic playing apparatus as claimed in claim 4, wherein each of said endless tape cartridges is cut away at its four corners to be a hexagonal cartridge.

6. An automatic playing apparatus for use with a plurality of endless tape cartridges comprising a first planar housing provided to receive two pairs of endless tape cartridges horizontally and diametrically to allow the forward ends thereof to be outwardly oriented; a second planar housing provided to receive a second two pairs of endless tape cartridges horizontally and diametrically to allow the forward ends thereof to be outwardly oriented; said first housing being arranged over said second housing at a certain interval between the two and being diagonally crossed with the latter; a cylindrical hollow shaft securely mounted to said first and second housings at the center thereof; a rotary shaft inserted within said hollow shaft and supported to cooperate with the latter; a planar rotary disc secured to said rotary shaft at the center thereof and positioned adjacent to said second housing; normally raised pushbutton rods for indexing the cartridge to play the tape and slidably mounted on said disc adjacent to and associated with each of said cartridges the rods being slidable independently of each other; rotary disc driving means integrally rotating the rotary disc and said rotary shaft; a stop member for arresting rotation of said rotary disc when said stop member is engaged by a depressed pushbutton rod to bring the cartridge as indexed in the play position; a pivotally movable deck including a capstan adapted to be in abutment with a pinch roller of the cartridge received within said first and second housing when the cartridge is in the play position, capstan driving means, a magnetic head adapted to be in engagement with the endless tape of the cartridge received by the first and second housing when the cartridge is in the play position, and a cartridge guide supporting the forward end of the cartridge in the play position; spring means normally urging said deck against the cartridge in the play position; means for sensing an end mark on said tape and deck driving means responsive to said sensing means for retracting said deck from the cartridge; pushbutton rod return means coupled to and movable with said deck movable in response to actuation of said deck driving means to move a depressed pushbutton rod engaging said stop member out of engagement therewith and to return said depressed rod to its normal raised position, said rotary disc driving means being operatively independent of said pushbutton rod return means; and deck retaining means maintaining the deck in the position where said deck is away from the cartridge at least until the depressed pushbutton rod is engaged with the stop member.

7. An automatic playing apparatus as claimed in claim 6 comprising a plurality of pushbutton rods slidably mounted in the rotary disc to correspondingly face each cartridge provided at the first and second housing for indexing the cartridge and the sound track thereof, and sound track switching-over means operable by means of the pushrod when the depressed pushbutton rod is engaged with the stop member.

8. An automatic playing apparatus as claimed in claim 6 wherein said rotary disc driving means comprises a cylindrical hollow rotatable shaft embracing the downwardly extending rotary shaft of the rotary disc, a coil spring having one end thereof wound on said rotary shaft and the other end wound on said hollow shaft, and a pulley connected to said hollow shaft, a roller in abutment with the capstan, and a belt operatively connecting the pulley and the roller when the deck is away from the cartridge, said rotary disc being rotated when the deck is away from the cartridge.

9. An automatic playing apparatus as claimed in claim 6 wherein said first and second housing are each capable of receiving the cartridges to visually identify what program is recorded by a label attached to each lid of the cartridges.